(12) United States Patent
Isaji et al.

(10) Patent No.: US 10,641,322 B2
(45) Date of Patent: May 5, 2020

(54) BEARING ASSEMBLY UNIT AND MOTOR

(71) Applicant: NIDEC SANKYO CORPORATION, Nagano (JP)

(72) Inventors: Naoya Isaji, Nagano (JP); Hironori Kurosawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/048,372

(22) Filed: Jul. 30, 2018

(65) Prior Publication Data

US 2019/0032706 A1     Jan. 31, 2019

(30) Foreign Application Priority Data

Jul. 31, 2017   (JP) .................................. 2017-148040

(51) Int. Cl.
*F16C 19/16*     (2006.01)
*F16C 25/08*     (2006.01)
(Continued)

(52) U.S. Cl.
CPC ............ *F16C 19/16* (2013.01); *F16C 25/083* (2013.01); *F16C 33/58* (2013.01); *F16C 35/077* (2013.01);
(Continued)

(58) Field of Classification Search
CPC ........ F16C 19/06; F16C 19/16; F16C 25/083; F16C 33/58; F16C 35/077; F16C 2226/12;
(Continued)

(56) References Cited

U.S. PATENT DOCUMENTS

| 4,645,361 A | * | 2/1987 | Lakin | ................... H02K 5/1732 |
| | | | | 384/441 |
| 5,624,193 A | * | 4/1997 | Vogelsberger | ........ F16C 25/083 |
| | | | | 267/163 |

(Continued)

FOREIGN PATENT DOCUMENTS

| CN | 101436801 | 5/2009 |
| CN | 103842670 | 6/2014 |

(Continued)

OTHER PUBLICATIONS

"Search Report of Europe Counterpart Application", dated Nov. 21, 2018, p. 1-p. 6.

(Continued)

*Primary Examiner* — Marcus Charles
(74) *Attorney, Agent, or Firm* — JCIPRNET

(57) ABSTRACT

A bearing assembly unit (5) includes an outer holder (10) configured with a cylindrical member; an inner holder (20) that is configured with a cylindrical member, and inserted into an inner circumferential surface of the outer holder (10) so as to be movable in an axial direction; and a rolling bearing element (30) which is inserted into an inner circumferential section of the inner holder (20) so as to be fixed at least in a circumferential direction, and into which a shaft (40) is inserted so as to be fixed there; wherein, between the outer holder (10) and the inner holder (20), there is provided a rotation restriction mechanism (12, 22) that prevents a relative rotation between the outer holder (10) and the inner holder (20).

5 Claims, 5 Drawing Sheets

(51) Int. Cl.
*F16C 35/077* (2006.01)
*H02K 5/173* (2006.01)
*F16C 33/58* (2006.01)

(52) U.S. Cl.
CPC ........ *H02K 5/1732* (2013.01); *F16C 2226/76* (2013.01); *F16C 2229/00* (2013.01); *F16C 2300/54* (2013.01)

(58) Field of Classification Search
CPC .............. F16C 2226/76; F16C 2229/00; F16C 2300/54; H02K 5/1732
USPC ....... 384/441, 513, 517, 537, 584–586, 588; 310/90
See application file for complete search history.

(56) References Cited

U.S. PATENT DOCUMENTS

| | | | | |
|---|---|---|---|---|
| 6,270,260 | B1* | 8/2001 | Hale | F16C 25/08 384/537 |
| 8,459,875 | B2* | 6/2013 | Otsuka | F16C 25/083 384/537 |
| 8,602,656 | B2* | 12/2013 | Mashino | F16C 25/083 267/161 |
| 2004/0134708 | A1* | 7/2004 | Tanaka | B62D 5/064 180/417 |
| 2004/0228559 | A1* | 11/2004 | Horng | F16C 25/08 384/517 |
| 2005/0168085 | A1* | 8/2005 | Ihata | H02K 5/1732 310/90 |
| 2013/0028550 | A1 | 1/2013 | Otsuka | |
| 2014/0184004 | A1* | 7/2014 | Yamaguchi | H02K 5/1732 310/90 |
| 2014/0312727 | A1* | 10/2014 | Shinosaka | H02K 5/1732 310/90 |
| 2016/0056680 | A1 | 2/2016 | Tanaka et al. | |

FOREIGN PATENT DOCUMENTS

| | | |
|---|---|---|
| CN | 104115372 | 10/2014 |
| CN | 105379074 | 3/2016 |
| JP | S55109133 | 7/1980 |
| JP | 2013044435 | 3/2013 |

OTHER PUBLICATIONS

"Office Action of China Counterpart Application," with machine English translation thereof, dated Sep. 3, 2019, p. 1-p. 13.

* cited by examiner

BEARING ASSEMBLY UNIT AND MOTOR

CROSS REFERENCE TO RELATED APPLICATION

The disclosure claims priority under 35 U.S.C. § 119 to Japanese Application No. 2017-148040 filed Jul. 31, 2017, the entire content of which is incorporated herein by reference.

FIELD OF THE DISCLOSURE

The disclosure relates to a bearing assembly unit and a motor.

BACKGROUND

Conventionally, known is a motor in which a bearing assembly unit, including a rolling bearing element, is placed between a rotor part and a stator part. In the motor, used is the bearing assembly unit in which a sleeve is so provided as to surround a bearing element in order to prevent an inner ring and an outer ring of the bearing element from rolling together, and the sleeve and the bearing element are fixed to each other by use of an adhesive (for example, refer to Patent Document 1).

PRIOR ART DOCUMENT

Patent Document

Patent Document 1: Japanese Unexamined Patent Application Publication No. 2013-44435

SUMMARY OF DISCLOSURE

Problem to Be Solved

Unfortunately, characteristics of the adhesive are likely affected by thermal condition. Therefore, in the case where the bearing assembly unit described above is used in the motor that is expected to operate under environment of high temperature above 100 degrees Celsius; for example, such as an in-car motor; heat generated by the motor itself also affects so that adhesion strength between the sleeve and the bearing element may sometimes deteriorate. As a result of that, it becomes difficult to prevent the inner ring and the outer ring of the bearing element from rolling together, so that there exists a problem that it is difficult to materialize a stable turning operation under environment of high temperature. Furthermore, in the case of the motor provided with the bearing assembly unit, described above, it becomes difficult because of generation of a vibration, a noise, and the like, to make the motor stably turn, in such a way that a life of the motor decreases.

With the issue described above being taken into consideration, it is an issue of the disclosure to provide a bearing assembly unit, a motor and an assembling method of the bearing assembly unit that materialize a stable turning operation even under environment of high temperature, so as to lead to a long component life.

Means to Solve the Problem

In order to solve the issue described above, a bearing assembly unit according to the disclosure includes an outer holder configured with a cylindrical member; an inner holder that is configured with a cylindrical member, and inserted into an inner circumferential section of the outer holder so as to be movable in an axial direction; and a rolling bearing element which is inserted into an inner circumferential section of the inner holder so as to be fixed at least in a circumferential direction, and into which a shaft is inserted so as to be fixed there; wherein, a rotation restriction mechanism that prevents a relative rotation between the outer holder and the inner holder is disposed between the outer holder and the inner holder.

In the case of the bearing assembly unit according to the disclosure, it becomes possible to prevent the rolling bearing element, namely the inner holder, from rolling together without using an adhesive, in association with relative turning operation of the shaft in relation to the outer holder. As a result, it becomes possible to materialize a stable turning operation even under environment of high temperature.

In the disclosure, the rotation restriction mechanism includes a first engagement part shaped in the outer holder, a second engagement part shaped in the inner holder, and an engagement member that is provided between the outer holder and the inner holder so as to engage the first engagement part and the second engagement part with each other in the circumferential direction. In this case, it is preferable that the first engagement part is a protrusion that protrudes from a bottom surface of the outer holder in the axial direction, and the second engagement part is a protrusion that protrudes from an inner circumferential surface of the inner holder in a radial direction, and the engagement member is a disc component disposed between the bottom surface of the outer holder and the inner holder, and the engagement member includes either an opening part or a slit for engaging with the first engagement part, and a protrusion that protrudes toward the inner holder in the axial direction so as to engage with the second engagement part. Furthermore, it is preferable that the engagement member serves as a pre-compression force applying unit that provides a pre-compression force to the rolling bearing element.

Moreover, in the disclosure, it is preferable that the rolling bearing element is fixed to the inner holder, by the intermediary of an O-ring disposed on an outer circumferential surface of the rolling bearing element. According to this configuration, it becomes possible to fix the rolling bearing element and the inner holder to each other, without using an adhesive.

In the disclosure, the rotation restriction mechanism includes; a first engagement part shaped in the outer holder, and a second engagement part that is shaped in the inner holder so as to engage with the first engagement part in the circumferential direction. In this case, it is preferable that; the first engagement part is a protrusion shaped along the axial direction on an inner circumferential surface of the outer holder, and the second engagement part is a recess shaped along the axial direction on an outer circumferential surface of the inner holder; or otherwise, the first engagement part is a recess shaped along the axial direction on the inner circumferential surface of the outer holder, and the second engagement part is a protrusion shaped along the axial direction on the outer circumferential surface of the inner holder.

Moreover, in the disclosure, it is preferable that the bearing assembly unit includes a pre-compression force applying unit configured with a disc component, and the pre-compression force applying unit is disposed between a bottom surface of the outer holder and the rolling bearing element, for providing a pre-compression force to the rolling bearing element.

Moreover, in the disclosure, it is preferable that the rolling bearing element is press-fitted into the inner circumferential section of the inner holder. According to this configuration, it becomes possible to fix the rolling bearing element and the inner holder to each other, without using an adhesive.

Furthermore, a motor according to the disclosure includes: a rotor fixed to either one of the outer holder and the shaft; and a stator fixed to the other one of the outer holder and the shaft. In the case of the motor according to the disclosure; it becomes possible to maintain a stable turning operation even under environment of high temperature, so that it becomes possible to lead to a long motor life.

Advantageous Effect of the Disclosure

As described above, in the case of the bearing assembly unit according to the disclosure; it becomes possible to materialize a stable turning operation even under environment of high temperature. Furthermore, in the case of the motor according to the disclosure; it becomes possible to prevent the rolling bearing element from rolling together so as to maintain a stable turning operation even under environment of high temperature, so that it becomes possible to lead to a long motor life.

DESCRIPTION OF THE PREFERRED EMBODIMENTS

With reference to the drawings, embodiments according to the disclosure are explained below. Although an explanation in the present specification document, is made by use of an example of a case in which a bearing assembly unit according to the disclosure is applied to a motor, the disclosure is not limited to the case and may be applied to a pump, a compressor, and the like. Moreover, as a motor to which the disclosure is applied, there is not only a motor in which a rotor part is fixed to a shaft (shaft component) and a stator is fixed to an outer holder, as this specification document describes; but also there may be a motor, needless to describe, in which a rotor is fixed to an outer holder and a stator is fixed to a shaft, the other way around.

(General Configuration of Motor)

Figure 1:
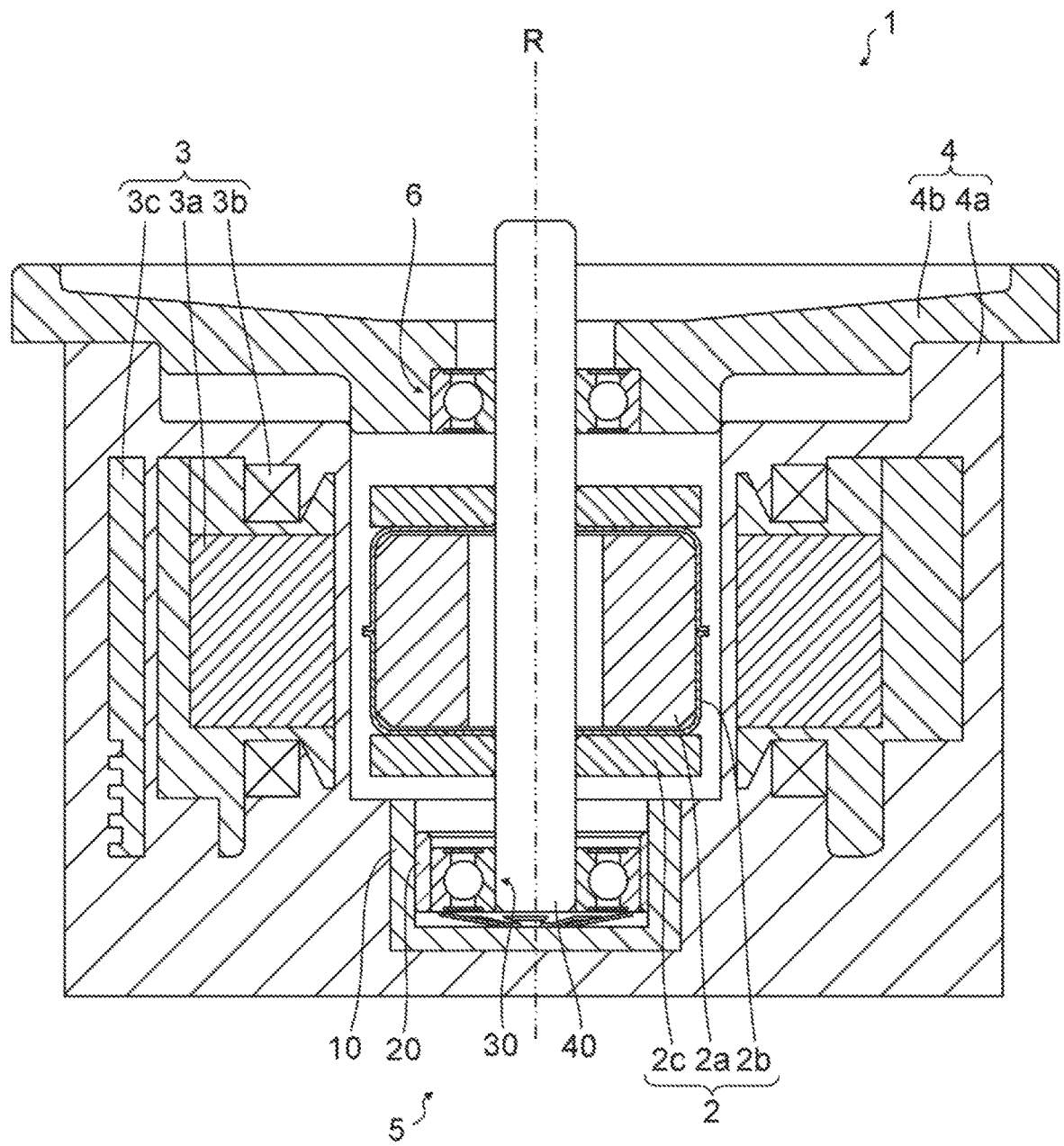
FIG. 1 is a schematic cross-sectional view of a motor provided with a bearing assembly unit according to the disclosure.

With reference to FIG. 1, a configuration of a motor provided with a bearing assembly unit according to the disclosure is explained at first. FIG. 1 is a schematic cross-sectional view of the motor provided with the bearing assembly unit according to the disclosure, and the figure is a view showing a cross-section being in parallel with a rotation axis of the motor. Though the figure shows a case where a direction of the rotation axis of the motor is placed in a vertical direction, the figure does not put any restriction on a posture of the motor according to the disclosure in operation. Then, as a matter of convenience for explanation below, the direction of the rotation axis of the motor is referred to as an 'axial direction'; and meanwhile a radial direction and a circumferential direction with respect to the rotation axis as a center are simply referred to as a 'radial direction' and a 'circumferential direction', respectively. Incidentally, though FIG. 1 shows a case in which a bearing assembly unit according to the second embodiment is applied, a bearing assembly unit according to the first embodiment is also applicable in the same manner.

A motor 1 is a so-called inner-rotor-type mold motor that has a both-end-support bearing structure; and the motor 1 includes a rotor part 2, a stator part 3, a housing 4, and a bearing assembly unit 5.

(Rotor Part)

The rotor part 2 is fixed to a shaft 40, and the rotor part 2 is a turning element that turns together with the shaft 40, and the rotor part 2 includes a rotor magnet 2a, a magnet cover 2b, and a plate 2c.

The rotor magnet 2a is a permanent magnet extending in an axial direction, being placed along a circumferential direction around the shaft 40. At an outer circumferential side of the rotor magnet 2a, there is formed a magnet surface that faces the stator part 3 in a radial direction; and then, in the magnet surface, an N-pole and an S-pole are magnetized alternately in a circumferential direction. The magnet cover 2b is so provided as to cover the rotor magnet 2a, for the purpose of preventing the rotor magnet 2a composed of ferrite, from scattering. At both ends of the magnet cover 2b in an axial direction, there is provided the plate 2c made of a non-magnetic material, such as stainless steel. At a surface of the plate 2c, which faces the magnet cover 2b, there is formed an elastic part, such as a disc spring or the like. By way of the magnet cover 2b being pushed toward the plate 2c, the rotor magnet 2a is linked together for sure, with a biasing force of the elastic part. Furthermore, the plate 2c is provided with a function for adjusting a rotor balance of the motor 1 after assembling the rotor part 2. Concretely to describe, after measuring the rotor balance, a hole is shaped in the plate 2c, as required, for the purpose of adjusting the balance.

(Stator Part)

The stator part 3 is so placed as to be cylindrical around the rotor part 2, and the stator part 3 is a stator element that works as an armature of the motor 1. In the present embodiment, the stator part 3 includes a stator core 3a, a coil 3b, and an insulator 3c. The stator part 3 is embedded in the housing 4 made of an insulating resin material, having high-thermo stability, such as polyphenylene sulfide (PPS) and the like; in a state where an inner circumferential surface of the stator part 3 is exposed in such a way that the inner circumferential surface faces an outer circumferential surface of a rotor magnet 2a, across a clearance.

The stator core 3a is composed of laminated steel plates made by way of laminating a plurality of magnetic steel plates, such as silicon steel sheets, in an axial direction. Each of the magnetic steel plates has an annular part and a plurality of magnetic polar teeth protruding inward from the annular part in a radial direction. In other words, the inner circumferential surface of the stator part 3 is configured with edge surfaces of the magnetic polar teeth. The coil 3b is configured with wire that is wounded around the magnetic polar teeth of the stator core 3a, by the intermediary of the insulator 3c. The insulator 3c is made of an insulating resin material, such as PPS, for electrically insulating the stator core 3a and the coil 3b from each other.

In this situation, supplying the coil 3b with a drive current generates magnetic flux in a radial direction, along the magnetic polar teeth as a magnetic core. As a result, a torque in a circumferential direction is generated between the magnetic polar teeth and the rotor magnet 2a, so that the rotor part 2 turns together with the shaft 40, by use of a central axis of the shaft 40 as a rotation axis R.

The housing 4 is configured with a housing main body 4a and a housing cover 4b. The housing main body 4a is provided with a cylindrical shape, having a closed bottom and an open top section; and then the rotor 2 is housed in an internal space of the housing main body 4a. The housing main body 4a is shaped by means of a so-called insert-molding method. Concretely to describe, the housing main body 4a is shaped by way of injecting a resin material into a mold, after placing the stator part 3 into the mold, so as to integrate the stator part 3 and the resin material. The housing cover 4b is fixed to the housing main body 4a in such a way as to cover the open section of the housing main body 4a, and to support a second rolling bearing element 6.

First Embodiment

Figure 2:
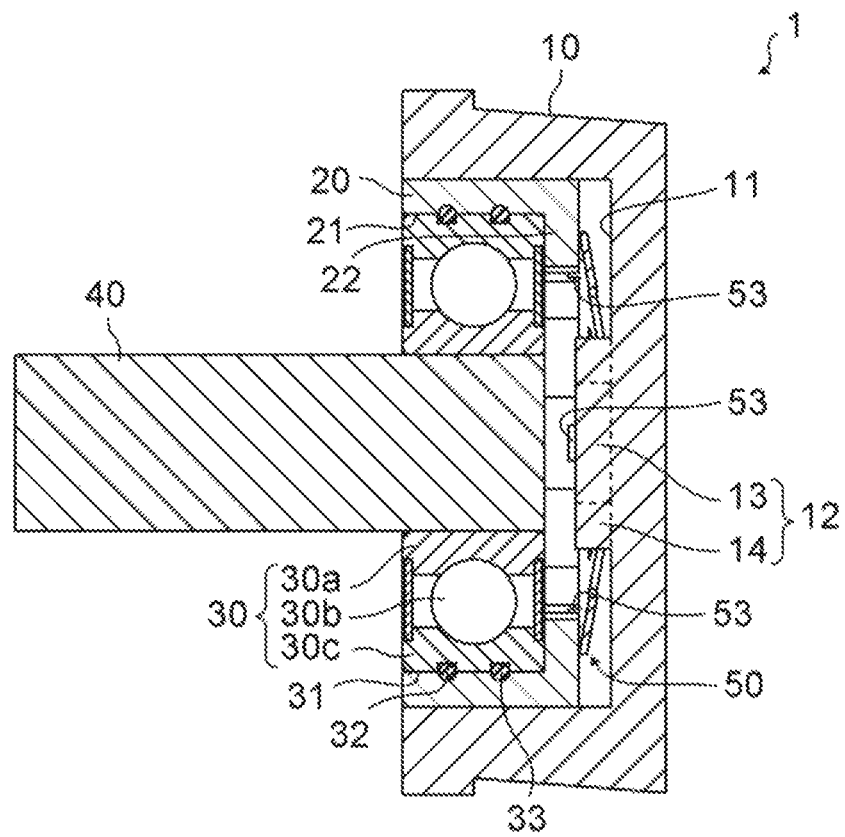
FIG. 2 includes a schematic cross-sectional view and a schematic exploded perspective view of a bearing assembly unit relating to a first embodiment of the disclosure, wherein (a) of FIG. 2 shows the schematic cross-sectional view, and meanwhile (b) of FIG. 2 shows the schematic exploded perspective view.
Figure 2:
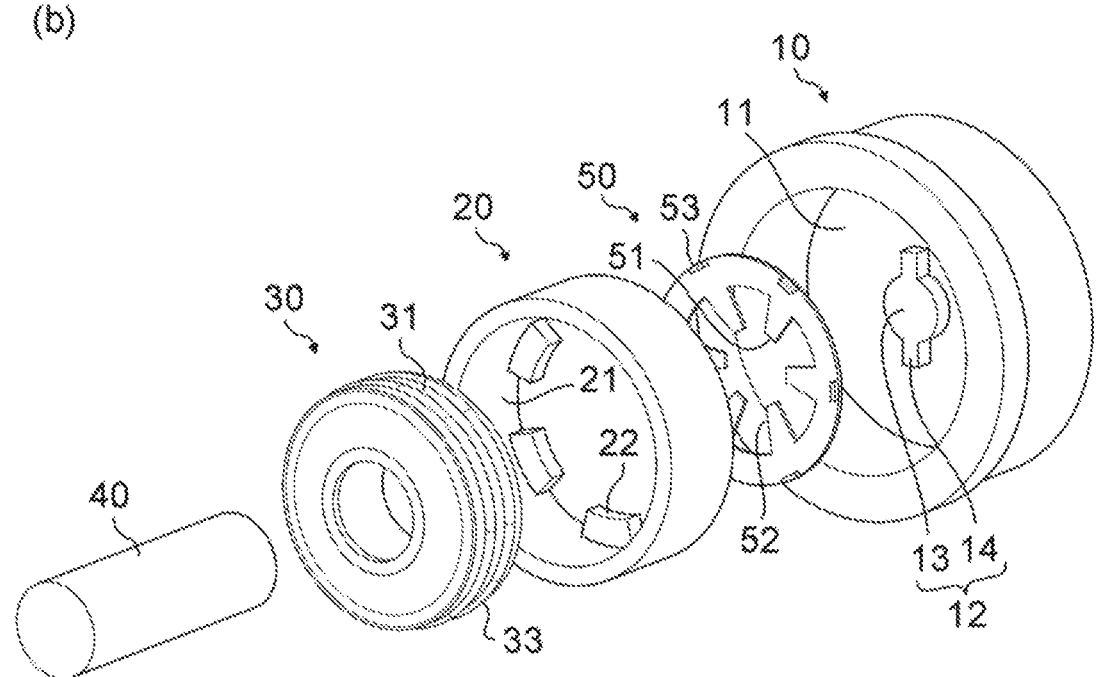

Explained below with reference to FIG. 2 is a configuration of a bearing assembly unit according to the first embodiment of the disclosure; in particular, a configuration of an outer holder, an inner holder, a first rolling bearing element (hereinafter, simply called a 'rolling bearing element') and a shaft. (a) of FIG. 2 is a schematic cross-sectional view, along an axial direction, of the bearing assembly unit according to the present embodiment, and meanwhile (b) of FIG. 2 is a schematic exploded perspective view of the bearing assembly unit according to the present embodiment.

The bearing assembly unit 5 supports the rotor part 2 and the stator part 3, of the motor 1, in such a way as to enable a relative rotation between these two parts; and the bearing assembly unit 5 includes an outer holder 10, an inner holder 20, a rolling bearing element 30, a shaft 40, and a rotation restriction mechanism (having a first engagement part 12 and a second engagement part 22).

The outer holder 10 is a cylindrical member that extends in an axial direction and has a closed bottom; and at a counter-output side of the motor 1, the outer holder 10 is fixed to the housing main body 4a. The inner holder 20 is a cylindrical member that extends in an axial direction; and the inner holder 20 is inserted into an inner circumferential section of the outer holder 10, and movable in the axial direction in relation to the outer holder 10. The rolling bearing element 30 is inserted into an inner circumferential section of the inner holder 20, and fixed in relation to the inner holder 20, at least in a circumferential direction. Concretely to describe, in an outer circumferential surface 31 of the rolling bearing element 30, there are formed two circumferential grooves 32; and then the rolling bearing element 30 is fixed to an inner circumferential surface 21 of the inner holder 20, by the intermediary of an O-ring 33 placed in the circumferential grooves 32.

The rolling bearing element 30 is a ball bearing element; provided with an inner ring 30a, two or more rolling elements 30b, and an outer ring 30c; which supports the shaft 40 so as to be rotatable. The inner ring 30a and the outer ring 30c are individually a metallic annular component, and the outer ring 30c is placed at an outer side in a radial direction, of the inner ring 30a. The rolling elements 30b are spherical components that are positioned between an outer circumferential surface of the inner ring 30a and an inner circumferential surface of the outer ring 30c. The shaft (shaft component) 40 is a metallic round-columnar member that extends in an axial direction; and the shaft 40 is press-fitted into an inner circumferential section of the rolling bearing element 30 so as to be fixed there.

Between a bottom surface 11 of the outer holder 10 and the inner holder 20, there is placed a pre-compression spring (a pre-compression force applying unit) 50 that is a disc spring. The pre-compression spring 50 provides a pre-compression force to the rolling bearing element 30, by means of pressing the outer ring 30c in an axial direction, against the inner ring 30a of the rolling bearing element 30 fixed to the shaft 40, by way of the inner holder 20. Furthermore, the pre-compression spring 50 also serves as an engagement member that engages with the outer holder 10 and the inner holder 20 individually in a circumferential direction. Moreover, the pre-compression spring 50 makes up a part of the rotation restriction mechanism that prevents a relative rotation between the outer holder 10 and the inner holder 20.

Figure 3:
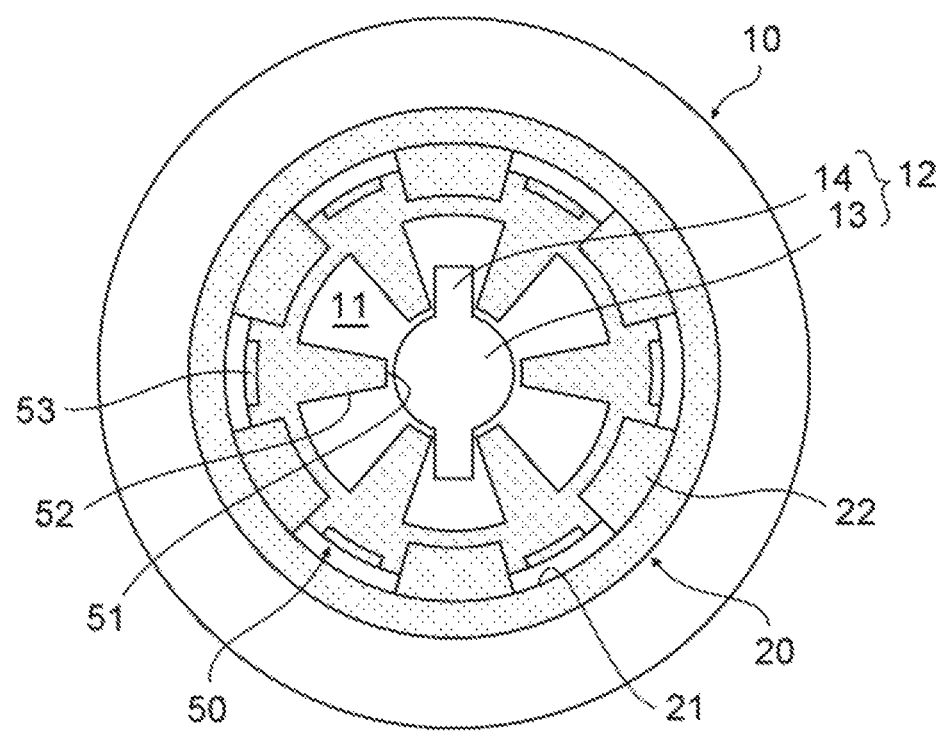
FIG. 3 is a schematic plan view of a rotation restriction mechanism relating to the first embodiment of the disclosure.

Details of the rotation restriction mechanism according to the present embodiment are explained below, with reference to FIG. 1, FIG. 2 and FIG. 3. FIG. 3 is a schematic plan view of the rotation restriction mechanism according to the present embodiment.

According to the present embodiment, the rotation restriction mechanism includes the first engagement part 12 shaped in the outer holder 10, and the second engagement part 22 that is shaped in the inner holder 20 so as to engage with the first engagement part 12 in a circumferential direction.

On the bottom surface 11 of the outer holder 10, there is shaped the protruding engagement part (first engagement part) 12 that protrudes from the bottom surface 11 in an axial direction; and then, the engagement part 12 includes a round-columnar part 13 placed at a center of the bottom surface 11, and a pair of arm parts 14 extending from the round-columnar part 13 in directions being opposite to each other. In the pre-compression spring 50 that is a disc component, there are shaped a center opening part 51 and a plurality of slits 52 that radially extend from the center opening part 51 in an outward radial direction. As shown in FIG. 3, the round-columnar part 13 of the protruding engagement part 12 is housed in the center opening part 51 of the pre-compression spring 50, and then the slits 52 engage with the arm parts 14 of the protruding engagement part 12 in a circumferential direction. A configuration in this way prevents a relative rotation of the pre-compression spring 50 in relation to the outer holder 10.

On the inner circumferential surface 21 of the inner holder 20, there are shaped a plurality of radially-protruding parts (second engagement part) 22 that are located at regular intervals in a circumferential direction, and individually protruding from the inner circumferential surface 21 in a radial direction. In the pre-compression spring 50, there are shaped a plurality of axially-protruding parts 53 that are located at regular intervals in a circumferential direction, and individually protruding toward the inner holder 20 in an axial direction. As shown in FIG. 3, the radially-protruding parts 22 of the inner holder 20 are individually located between the axially-protruding parts 53 of the pre-compression spring 50, so as to engage with the axially-protruding parts 53 in a circumferential direction. A configuration in this way prevents a relative rotation of the inner holder 20 in relation to the pre-compression spring 50.

Primary Function Effect of the Present First Embodiment

As explained above, in the case of the bearing assembly unit 5 according to the present embodiment; there is configured the rotation restriction mechanism (including the first engagement part 12 and second engagement part 22) between the outer holder 10 and the inner holder 20, in such a way as to accordingly prevent the relative rotation of the pre-compression spring 50 in relation to the outer holder 10, as well as the relative rotation of the inner holder 20 in relation to the pre-compression spring 50, so as to accordingly prevent a relative rotation between the outer holder 10 and the inner holder 20. As a result, according to the present embodiment, it becomes possible to prevent the rolling bearing element 30, namely the inner holder 20, from rolling together without using an adhesive, in association with turning operation of the shaft 40 (rotor) in relation to the outer holder 10 (stator). Therefore, it becomes possible for the bearing assembly unit 5 to materialize a stable turning operation even under environment of high temperature.

In the present embodiment, the rotation restriction mechanism (including the first engagement part 12 and second engagement part 22) is configured with the protruding engagement part 12 and the slits 52, in such a way that these two components engaging with each other prevents a relative rotation between the outer holder 10 and the pre-compression spring 50. Thus, it is possible to configure the rotation restriction mechanism by way of simple shaping. Furthermore, the pre-compression spring 50, which is one of engagement components for configuring the rotation restriction mechanism, provides a pre-compression force to the rolling bearing element 30. Therefore, it becomes possible to reduce the number of components required.

Moreover, in the present embodiment, the rolling bearing element 30 is fixed to the inner holder 20, by the intermediary of the O-ring 33 provided on the outer circumferential surface 31 of the rolling bearing element 30. According to this configuration, it becomes possible to fix the rolling bearing element 30 and the inner holder 20 to each other, without using an adhesive.

Moreover, the motor 1 according to the present embodiment is provided with the bearing assembly unit 5 described above. Therefore, it becomes possible to maintain a stable turning operation even under environment of high temperature (for example, 100 degrees Celsius or higher), so that it becomes possible to lead to a long life of the motor 1.

Modification of the First Embodiment

Described above is only an example of a preferred embodiment according to the disclosure, and then the disclosure is not limited to the above embodiment and various variations and modifications may be made without changing the concept of the disclosure.

With respect to the configuration of the protruding engagement part 12 and the slits 52; although these two elements engaging with each other prevents a relative rotation between the outer holder 10 and the pre-compression spring 50 in the embodiment described above, the configuration is not limited to the illustrated one. For example, the number of the arm parts 14 of the protruding engagement part 12 may be either one or three or more, and then the number of the slits 52 may also be changed accordingly. Moreover, with respect to size of the arm parts 14 and the slits 52 (width and length), there is no specific restriction, as far as the slits 52 are able to house the arm parts 14; and for example, there may be somewhat play in a circumferential direction. Furthermore, as a substitute for the arm parts 14, there may be at least one protrusion that engages with the slits 52, at a location being distant in a circumferential direction from the round-columnar part 13. In such a case, the round-columnar part 13 may be omitted; and the slits 52 may be provided at an outer circumferential side of the pre-compression spring 50; or there may be shaped at least one opening part as a substitute for the slits 52, which engages with at least one protrusion, at a location being distant in a circumferential direction from the center opening part 51.

Moreover, with respect to the configuration of the radially-protruding parts 22 and the axially-protruding parts 53 as well, the configuration is not limited to the illustrated one, as far as these components engaging with each other make it possible to prevent a relative rotation between the inner holder 20 and the pre-compression spring 50. For example, the number of the radially-protruding parts 22 and the number of the axially-protruding parts 53 may be the same as, or different from each other. Furthermore, there is no specific restriction, with respect to size of the radially-protruding parts 22 and the axially-protruding parts 53 (width and length). There may exist somewhat play in a circumferential direction as shown in FIG. 3, or the components may closely contact with each other in the circumferential direction.

Although a ball bearing element is employed as the rolling bearing element 30 in the present embodiment, any type of rolling bearing element other than a ball bearing element, for example a taper-roller bearing element, may be employed. Furthermore, a fixing method for the shaft 40 is not limited to press-fitting, and the shaft 40 inserted into the rolling bearing element 30 may be fixed by way of another method, such as bolting.

Figure 4:
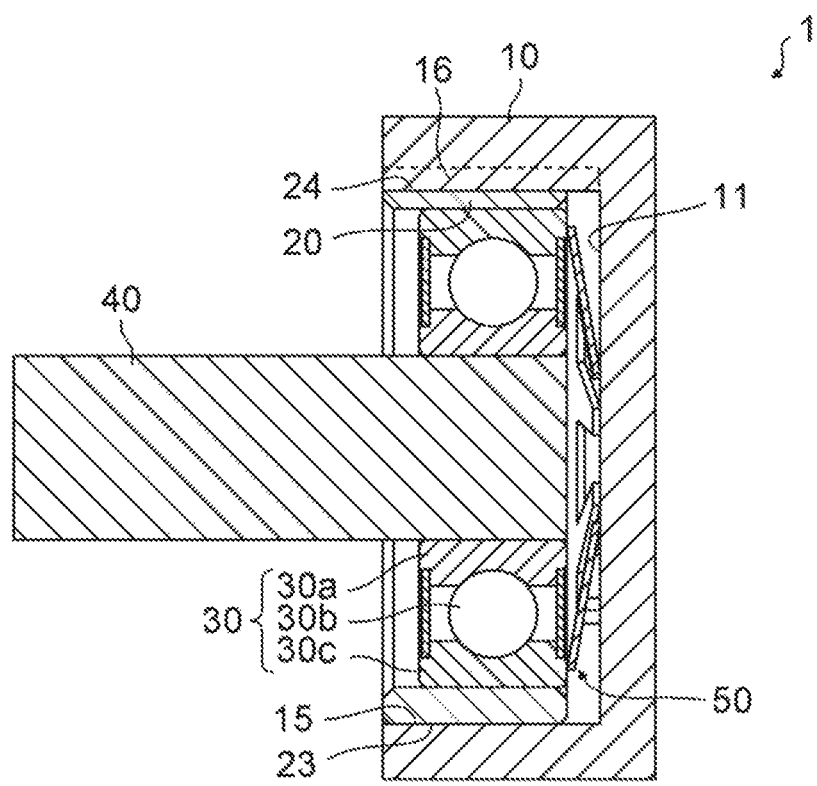
FIG. 4 includes a schematic cross-sectional view and a schematic exploded perspective view of a bearing assembly unit relating to a second embodiment of the disclosure, wherein (a) of FIG. 4 shows the schematic cross-sectional view, and meanwhile (b) of FIG. 4 shows the schematic exploded perspective view.
Figure 4:
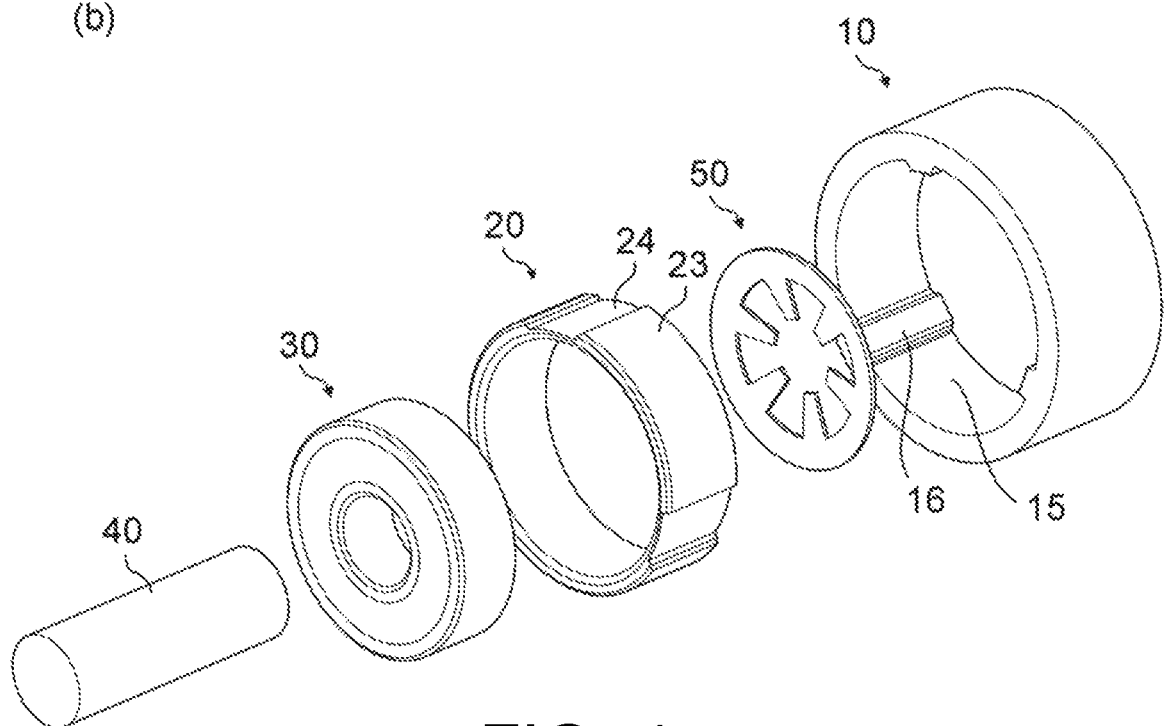
Figure 5:
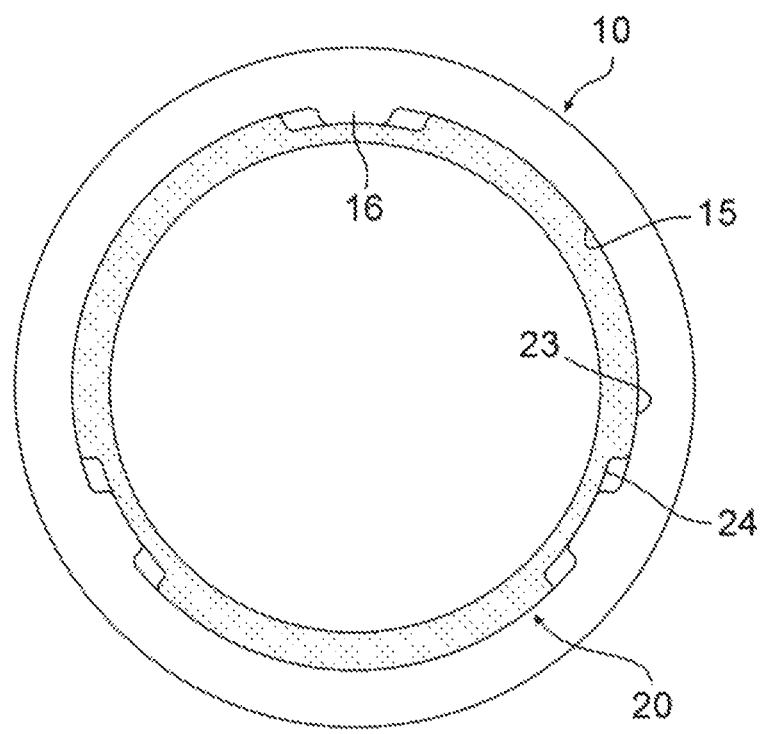
FIG. 5 is a schematic plan view of a rotation restriction mechanism relating to the second embodiment of the disclosure.

Second Embodiment (a) of FIG. 4 is a schematic cross-sectional view, along an axial direction, of a bearing assembly unit relating to a second embodiment of the disclosure, and meanwhile (b) of FIG. 4 is a schematic exploded perspective view of the bearing assembly unit according to the present embodiment. FIG. 5 is a schematic plan view of a rotation restriction mechanism according to the present embodiment, the rotation restriction mechanism being viewed in an axial direction. In the explanation below; with regard to a configuration that is the same as a corresponding configuration in the first embodiment, the same reference numeral is provided for the configuration in the view, and the explanation is omitted; and meanwhile, only a configuration that is different from the corresponding configuration in the first embodiment is explained.

The rotation restriction mechanism shown in the second embodiment is configured with a first engagement part 16 and a second engagement part 24. Concretely to describe, for the rotation restriction mechanism, a plurality of axial-direction ribs (protrusions) 16 are shaped along an axial direction on an inner circumferential surface 15 of the outer holder 10, and a plurality of axial-direction grooves (recesses) 24 are shaped along an axial direction on an outer circumferential surface 23 of the inner holder 20. In other words, as shown in FIG. 5; the axial-direction ribs 16 as the first engagement part and the axial-direction grooves 24 as the second engagement part engage with each other in a circumferential direction in such a way as to prevent a relative rotation between the outer holder 10 and the inner holder 20. In accordance with that, the pre-compression spring 50 is different from the corresponding one in the first embodiment, in such a way that the pre-compression spring 50 does not individually engage with the outer holder 10 and the inner holder 20, and then simply serves as a means for providing a pre-compression force. Then, the rolling bearing element 30 is press-fitted into an inner circumferential section of the inner holder 20 so as to be fixed there, and no circumferential groove is formed in the outer circumferential surface 31 of the rolling bearing element 30, and no O-ring is provided.

Primary Function Effect of the Second Embodiment

As explained above, the bearing assembly unit 5 according to the present embodiment includes; the outer holder 10 configured with a cylindrical member; the inner holder 20 that is configured with a cylindrical member, and inserted into an inner circumferential section of the outer holder 10 so as to be movable in an axial direction; and the rolling bearing element 30 which is inserted into an inner circumferential section of the inner holder 20 so as to be fixed at least in a circumferential direction, and into which the shaft 40 is inserted so as to be fixed there; and then, between the outer holder 10 and the inner holder 20, there is provided the rotation restriction mechanism (including the first engagement part 16 and the second engagement part 24) that prevents the relative rotation between the outer holder 10 and the inner holder 20.

Accordingly, it becomes possible to prevent the rolling bearing element 30, namely the inner holder 20, from rolling together without using an adhesive, in association with relative turning operation of the shaft 40 in relation to the outer holder 10. As a result, it becomes possible for the bearing assembly unit 5 to materialize a stable turning operation even under environment of high temperature.

In the present embodiment, the rotation restriction mechanism is configured with the first engagement part 16 shaped in the outer holder 10, and the second engagement part 24 that is shaped in the inner holder 20 so as to engage with the first engagement part 16 in the circumferential direction. Thus, it is possible to configure the rotation restriction mechanism by way of simple shaping.

In the present embodiment, the bearing assembly unit 5 includes a pre-compression force applying unit (a pre-compression spring), configured with a disc component, and the pre-compression force applying unit is disposed between the bottom surface 11 of the outer holder 10 and the rolling bearing element 30, for providing the rolling bearing element 30 with a pre-compression force. Therefore, it becomes possible to reduce the number of components required.

In the present embodiment, the rolling bearing element 30 is press-fitted into the inner circumferential section of the inner holder 20. According to this configuration, it becomes possible to fix the rolling bearing element 30 and the inner holder 20 to each other, without using an adhesive.

Moreover, the motor 1 according to the present embodiment is provided with the bearing assembly unit 5 described above. Therefore, it becomes possible to maintain a stable turning operation even under environment of high temperature (for example, 100 degrees Celsius or higher), so that it becomes possible to lead to a long life of the motor 1.

Modification of the Second Embodiment

Described above is only an example of a preferred embodiment according to the disclosure, and then the disclosure is not limited to the above embodiment and various variations and modifications may be made without changing the concept of the disclosure.

In the illustrated example, though the pre-compression spring 50 is provided with slits, a disc spring having no slit may be employed since no engagement with the outer holder 10 is needed, as described above. Moreover, the axial-direction ribs 16 of the outer holder 10 may be prepared so as to be either combined with, or separate from the outer holder 10. In the case of being separate from the outer holder 10, a requirement for the axial-direction ribs 16 is only being fixed to the outer holder 10 in such a way as to be free from a movement in a circumferential direction, and the axial-direction ribs 16 may be movable in an axial direction. Furthermore, there is no specific restriction, with respect to width of the axial-direction ribs 16 and the axial-direction grooves 24. There may exist somewhat play in a circumferential direction as shown in FIG. 5, or the components may closely contact with each other in the circumferential direction. Moreover, there is also no specific restriction, with respect to length of the axial-direction ribs 16 and the axial-direction grooves 24; and it is not necessary to provide these components over a full extent of each of the outer holder 10 and the inner holder 20, in an axial direction; and these components may be provided only in a part of the full extent in the axial direction.

Furthermore, an only requirement is that one of the outer holder 10 and the inner holder 20 is provided with axial-direction grooves (recesses) shaped there, and meanwhile the other is provided with axial-direction ribs (protrusions) shaped there. In other words, the axial-direction grooves may be shaped on the inner circumferential surface 15 of the outer holder 10, and meanwhile the axial-direction ribs may be shaped on the outer circumferential surface 23 of the inner holder 20. In this case as well, the inner holder 20 and the axial-direction ribs may be either combined with, or separate from each other.

What is claimed is:
1. A bearing assembly unit comprising:
an outer holder configured with a cylindrical member;
an inner holder that is configured with a cylindrical member, and inserted into an inner circumferential section of the outer holder so as to be movable in an axial direction; and
a rolling bearing element which is inserted into an inner circumferential section of the inner holder so as to be fixed at least in a circumferential direction, and into which a shaft is inserted so as to be fixed there;
wherein, a rotation restriction mechanism that prevents a relative rotation between the outer holder and the inner holder is disposed between the outer holder and the inner holder, wherein, the rotation restriction mechanism includes a first engagement part shaped in the outer holder, a second engagement part shaped in the inner holder, and an engagement member that is provided between the outer holder and the inner holder so as to engage the first engagement part and the second engagement part with each other in the circumferential direction, wherein, the first engagement part is a protrusion that protrudes from a bottom surface of the outer holder in the axial direction, and the second engagement part is a protrusion that protrudes from an inner circumferential surface of the inner holder in a radial direction, and the engagement member is a disc component disposed between the bottom surface of the outer holder and the inner holder, and the engagement member includes either an opening part or a slit for engaging with the first engagement part, and a protrusion that protrudes toward the inner holder in the axial direction so as to engage with the second engagement part.

2. The bearing assembly unit according to claim 1;

wherein, the engagement member serves as a pre-compression force applying unit that provides a pre-compression force to the rolling bearing element.

3. The bearing assembly unit according to claim 1;

wherein, the rolling bearing element is fixed to the inner holder by an intermediary of an O-ring disposed on an outer circumferential surface of the rolling bearing element.

4. A motor comprising:

the bearing assembly unit according to claim 1;

a rotor fixed to either one of the outer holder and the shaft; and a stator fixed to the other one of the outer holder and the shaft.

5. The bearing assembly unit according to claim 1;

wherein, the rolling bearing element is press-fitted into the inner circumferential section of the inner holder.

* * * * *